US012611887B1

(12) United States Patent
Levi

(10) Patent No.: US 12,611,887 B1
(45) Date of Patent: Apr. 28, 2026

(54) PANOPTIC DISPLAY SURFACE

(71) Applicant: Jonathan Levi, Boston, MA (US)

(72) Inventor: Jonathan Levi, Boston, MA (US)

( * ) Notice: Subject to any disclaimer, the term of this patent is extended or adjusted under 35 U.S.C. 154(b) by 0 days.

(21) Appl. No.: 19/264,147

(22) Filed: Jul. 9, 2025

(51) Int. Cl.
*B43K 1/00* (2006.01)
*B43L 1/00* (2006.01)
*G09F 9/30* (2006.01)

(52) U.S. Cl.
CPC ............... *B43L 1/004* (2013.01); *B43L 1/008* (2013.01); *G09F 9/301* (2013.01)

(58) Field of Classification Search
CPC .......... B43L 1/00; B43L 1/08; G09F 13/0481; G09F 15/0031; A47G 1/1653
USPC ..... 434/408, 421, 428, 429, 430; 40/606.12, 40/646, 650, 738
See application file for complete search history.

(56) References Cited

U.S. PATENT DOCUMENTS 2,838,853 A * 6/1958 Batzdorff .................. B43L 1/06 434/421
3,605,851 A * 9/1971 Miles ........................ E04B 2/74 52/239
5,373,654 A * 12/1994 Whalen ................ A47G 1/1653 40/724
6,328,571 B1 * 12/2001 Dricken ............... A47B 97/001 434/408
6,464,507 B1 * 10/2002 Bailey .................... G09B 19/22 434/408
6,729,060 B1 * 5/2004 Rietkerk .............. A47G 1/1653 40/738
6,854,202 B1 * 2/2005 Ives .................... G09F 15/0087 40/606.15
8,915,745 B2 * 12/2014 Domey ................. C03C 21/002 434/408
9,403,400 B2 * 8/2016 McManus ................. B43L 1/10
9,428,907 B2 * 8/2016 Gupta ................... E04B 2/7438
10,626,602 B2 * 4/2020 Holbrook .................. E04B 2/78
2010/0099073 A1 * 4/2010 Howard ..................... B43L 1/06 434/408
2014/0377736 A1 * 12/2014 Essen ...................... B43L 1/008 434/408
2020/0146472 A1 * 5/2020 DeLeon ............... A47G 1/1653

* cited by examiner

*Primary Examiner* — Kurt Fernstrom
(74) *Attorney, Agent, or Firm* — Nutter McClennen & Fish LLP

(57) ABSTRACT

A display surface may include one or more of a top portion including a left section, a right section, and a concave curve between the left and right sections, a bottom portion, including a left section, a right section, and a concave curve between the left and right sections, a vertical distance below the top portion, and a vertical concave surface, between and directly coupled to the concave curve of the top and bottom portions, comprising one or more of a dry-erase surface, a tackable surface, a magnetic surface, and a writeable magnetic surface.

18 Claims, 5 Drawing Sheets

PANOPTIC DISPLAY SURFACE

FIELD

Illustrative embodiments generally relate to architecture and, more particularly, various embodiments of the invention relate to a space-efficient display structure for a room.

BACKGROUND

Classrooms have used reusable display surfaces going back to the early $19^{th}$ century. Early display surfaces were green or black slate chalkboards that were used with hand-held pieces of chalk and felt erasers. The chalkboards were typically rectangular in shape and frequently occupied most of a wall surface at a front of a room. Chalkboards were frequently undesirable due to creation of chalk dust while writing, sometimes resulting in medical conditions like asthma to those in proximity. Also, erasing could be time-consuming and frequently leave a chalk-colored residue on the chalkboard that could render further writing and illustration illegible. Chalkboards have been generally replaced by dry-erase whiteboards in the latter part of the $20^{th}$ century till the present day. Dry-erase whiteboards have the advantages of no chalk dust creation, less writing effort, and more vivid colors and contrast over chalkboards.

SUMMARY OF VARIOUS EMBODIMENTS

In accordance with one or more embodiments of the invention, a display surface may include a top portion including a left section, a right section, and a concave curve between the left and right sections, a bottom portion including a left section, a right section, and a concave curve between the left and right sections, a vertical distance below the top portion, and a vertical concave surface between and directly coupled to the concave curve of the top and bottom portions, including one or more of a dry-erase surface, a tackable surface, a magnetic surface, and a writeable magnetic surface.

In accordance with other embodiments, the dry erase surface faces outwardly from the display surface and may allow writing or illustration to be applied to the dry erase surface.

In accordance with other embodiments, the tackable surface faces outwardly from the display surface and may be configured to retain lightweight objects to the concave surface with fasteners or magnets.

In accordance with other embodiments, the magnetic surface may be configured to retain lightweight objects to the concave surface with one of magnets or ferromagnetic objects.

In accordance with other embodiments, the display surface may be configured to be mounted to an inside corner of a room such that intersections of the left and right sections of the top and bottom portions contact the inside corner.

In accordance with other embodiments, a width of the left section may be equal to a width of the right section and a radius of the concave surface.

In accordance with other embodiments, the display surface may include one or more vertical members between the top and bottom portions, configured to add stiffness to the display surface.

In accordance with other embodiments, the concave surface has a height of 2-4 feet.

In accordance with other embodiments, the display surface may include one or more mounting flanges affixed to one or more external edges, configured to affix the display surface to wall studs.

In accordance with other embodiments, a radiused wedge may include top and bottom surfaces and a concave vertical surface between the front edges of the top and bottom surfaces, including one or more of a dry-erase surface, a tackable surface, a magnetic surface, and a writeable magnetic surface. The top and bottom surfaces each include straight left rear and right rear edges meeting at a common point and angled with respect to each other, and an inwardly curved front edge that extends between a leftmost point of the left rear edge and a rightmost point of the right rear edge.

In accordance with other embodiments, the dry erase surface faces outwardly from the concave surface and allows writing or illustration to be applied to the dry erase surface.

In accordance with other embodiments, the concave vertical surface is configured to be mounted to an inside corner of a room such common points of the top and bottom surfaces contact the inside corner.

In accordance with other embodiments, one or more vertical members are between the top and bottom surfaces and configured to add stiffness to the radiused wedge.

In accordance with other embodiments, the dry erase surface faces outwardly from the concave surface and allows writing or illustration to be applied to the dry erase surface.

In accordance with other embodiments, the tackable surface may be configured to retain lightweight objects to the concave surface with fasteners or magnets.

In accordance with other embodiments, the magnetic surface is configured to retain lightweight objects to the concave surface with one of magnets or ferromagnetic objects.

In accordance with other embodiments, the inwardly curved front edges and the vertical surface may have a common horizontal plane radius that is the same as a width of the left rear edges and the right rear edges of the top and bottom surfaces.

In accordance with other embodiments, one or more mounting flanges are affixed to one or more external edges and may be configured to affix the radiused wedge to wall studs.

In accordance with other embodiments, a method may include forming identical horizontal top and bottom isosceles triangular surfaces, the top and bottom surfaces each having a concave hypotenuse, forming a concave vertical surface including one or more of a dry-erase surface, a tackable surface, a magnetic surface, and a writeable magnetic surface, and affixing the vertical surface to the hypotenuse of the top and bottom surfaces to create a display surface, the hypotenuse of the top and bottom surfaces and the vertical surface having a common horizontal radius.

In accordance with other embodiments, the method may include affixing one or more vertical members between the top and bottom portions to add stiffness to the display surface.

In accordance with other embodiments, external edges of the top and bottom surfaces may be affixed to one or more mounting flanges configured to affix the display surface to wall studs of a room interior.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Large rooms have ample space for one or more display surfaces. One or more walls may include white boards or chalkboards for presenters to write or illustrate on. Other walls may have limited space for display surfaces due to doors, windows, or closets. What is needed is additional space for display surfaces, especially in smaller rooms with limited wall space. Details of the embodiments are discussed below.

Figure 1A:
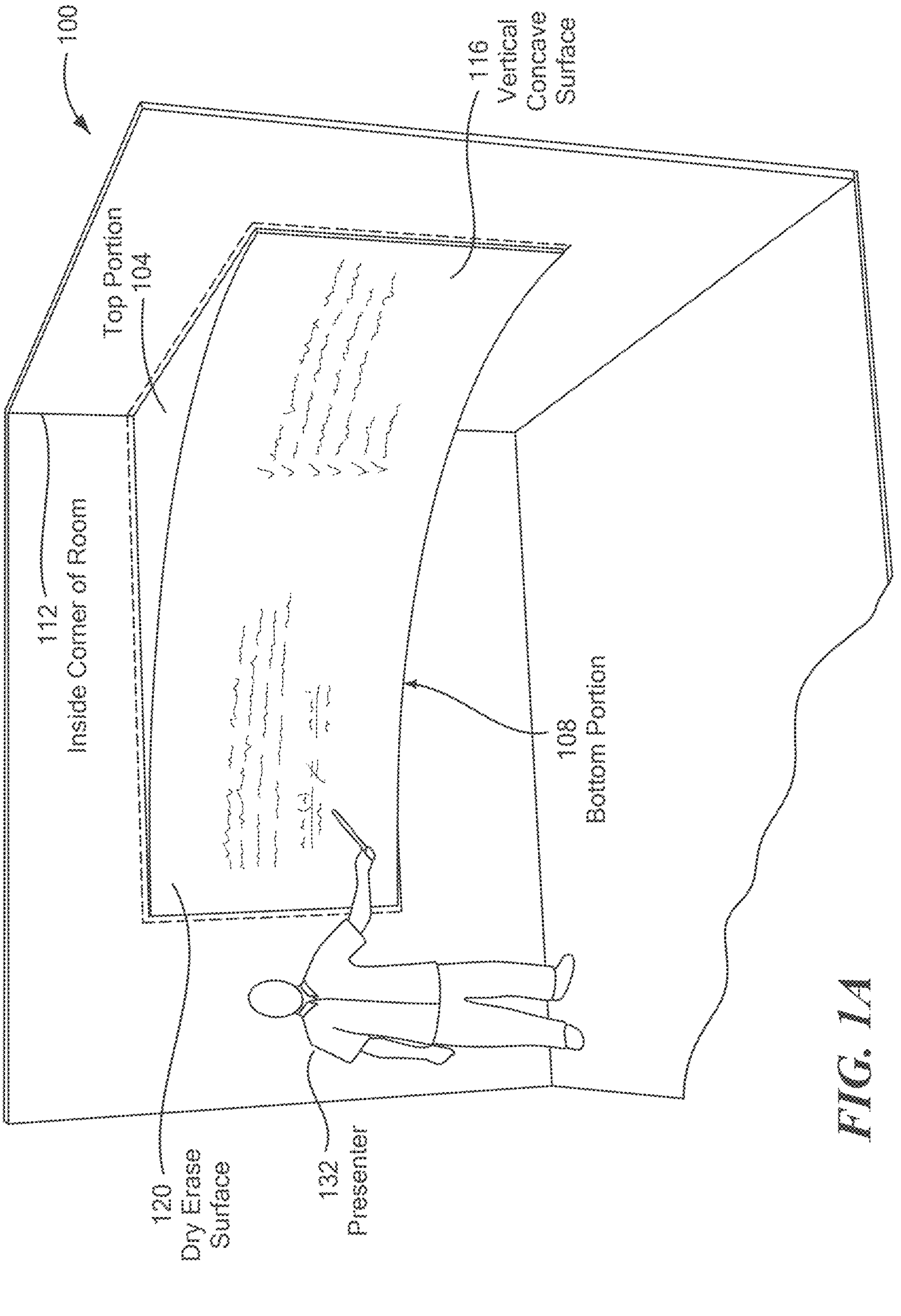
FIG. 1A schematically shows a panoptic display system with a dry erase display surface in accordance with illustrative embodiments of the invention.

FIG. 1A schematically shows a panoptic display system with a dry erase display surface 100 in use in accordance with illustrative embodiments of the invention. A panoptic display system 100 provides a single or multi-use surface for a presenter 132 and/or various observers in a room that utilizes space in one or more corners of the room 112. Unlike a conventional flat wall-mounted display surface like a chalkboard or whiteboard, a panoptic display surface 100 includes a curved front surface that spans portions of a pair of adjoining walls that meet at a corner of the room 112.

In the preferred embodiment, the curvature of the front of the display surface may be concave 116 to provide a consistent viewing distance for most observers. A concave shape 116 beneficially minimizes the amount of intrusion into the room interior. In another embodiment, the curvature of the front of the display surface may be convex, for example, to present different content to observers based on seating position within the room. In another embodiment, the display surface may be straight and not curved for improved ease of manufacture and assembly.

The panoptic display system 100 includes a generally horizontal top surface (top portion 104) and bottom surface (bottom portion 108) and a generally vertical front surface 116 where information is displayed. In some embodiments, the top 104 and bottom 108 surfaces may have identical dimensions and shapes. In other embodiments, the top 104 and bottom 108 surfaces may have different dimensions and/or shapes. For example, a bottom surface 108 may be 95% of the size of a top surface 104 to angle the front surface 116 downward to limit glare from sunlight through windows of the room or overhead lights. This may be a consideration for a glossy front surface used for a dry-erase marking.

In some embodiments, the vertical concave surface 116 may be left and right symmetric with respect to the corner of the room 112. In other words, a length of an edge of the top portion 104 facing a left wall may the same as a length of an edge of the top portion 104 facing a right wall. This may be ideal for rooms with a square footprint or where individuals who are receivers of presented material are evenly distributed/seated with respect to the corner of the room 112.

In other embodiments, the vertical concave surface 116 may not be left and right symmetric with respect to the corner of the room 112. This may be ideal for rooms with a rectangular footprint or where individuals who are receivers of presented material are not evenly distributed/seated with respect to the corner of the room (e.g., receivers along a narrower wall of a room). In this case, a length of an edge of the top portion 104 facing the left wall may be different from a length of an edge of the top portion 104 facing the right wall.

It may be preferable to minimize the weight of the panoptic display system 100 to provide less expensive transportation and easier mounting to walls and less stress on mounting fasteners and support structures within the walls. To that end, the top 104 and bottom 108 surfaces, internal structural members, and other left and right side support members may be made from composite materials such as rigid plastics, carbon fiber, fiberglass, or aluminum. In some embodiments plywood or other wood products may be used instead.

In one embodiment (not shown), the panoptic display system 100 may be horizontally mobile instead of rigidly coupled to an inside corner of a room 112. This may beneficially allow a room interior to be reconfigured by moving the panoptic display surface 100 to a different corner of the room or a different room. To achieve the mobility, the panoptic display surface 100 may have a structure below the bottom portion 108 that supports the weight of the panoptic display system 100 and provides partially or fully articulated rollers, casters, or wheels in contact with a floor of the room.

The vertical concave surface 116 may have a ferrous or magnetic backing to retain many metallic or magnetic objects. This may provide a magnetic and writeable display surface.

In one embodiment, one or more portions of the vertical concave surface 116 may be translucent to allow the portions to be backlit by one or more light sources (not shown). The portions may include, for example, a ferromagnetic strip around a periphery of the back of the portion to facilitate magnetic attachments of objects to the front. For example, an X-ray image or an architectural or landscaping plan on a mylar sheet may be magnetically affixed to a front of the portion and backlit by one or more light sources within the panoptic display surface 100. Such a portion may also serve as a dry erase surface as long as the translucence and color of the portion allows a significant amount of backlight through the surface while allowing dry marker writing and illustration to be legible given the local lighting conditions within the room.

Figure 1B:
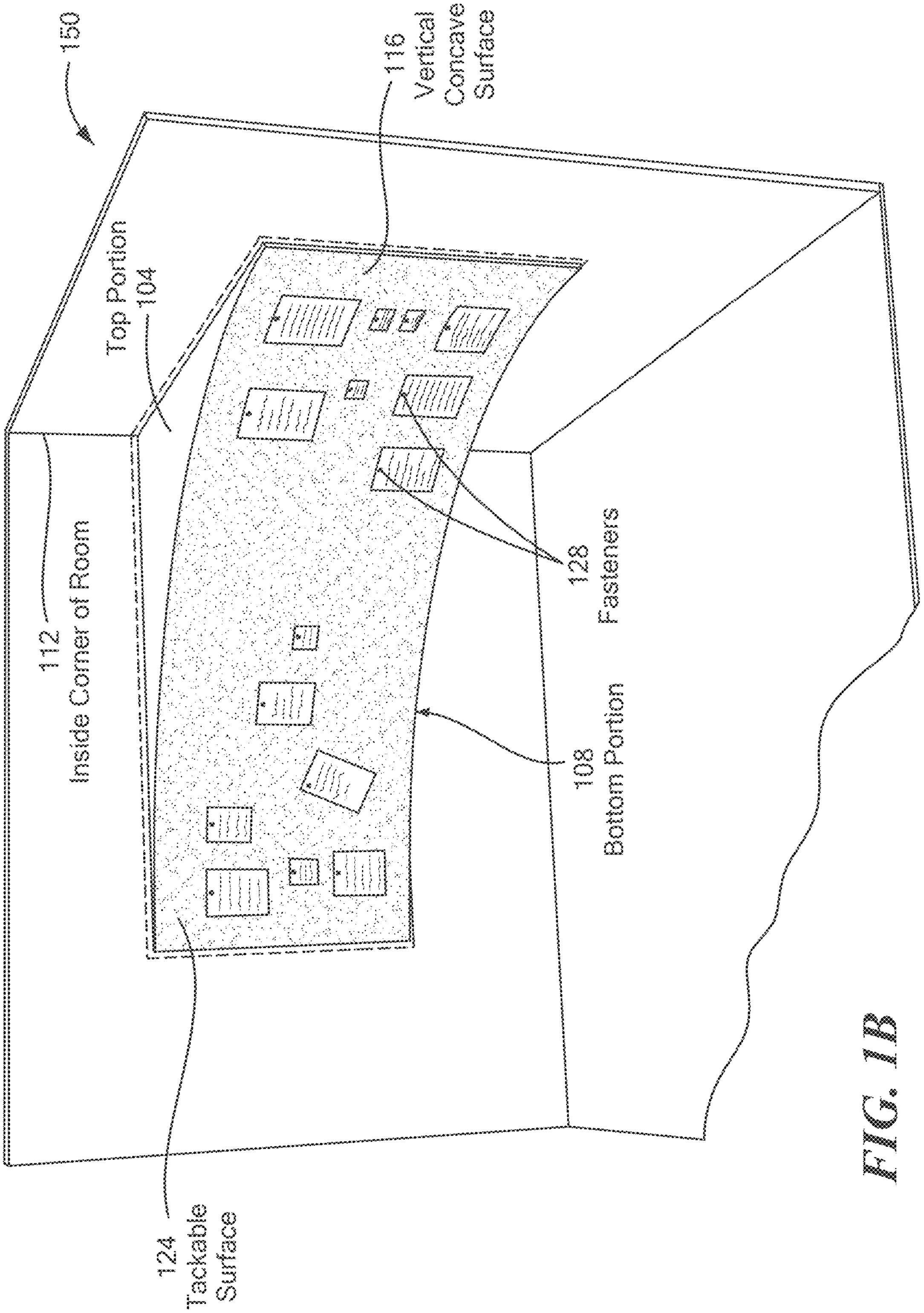
FIG. 1B schematically shows a panoptic display system with a tackable display surface in accordance with illustrative embodiments of the invention.

In one embodiment, the vertical concave surface 116 may be removable and replaceable for flexible configuration/reconfiguration. This may allow reconfiguration from a dry erase surface 120 to a tackable surface 124, for example FIG. 1B schematically shows a panoptic display system with a tackable display surface 150 in accordance with illustrative embodiments of the invention. In one embodiment, the tackable display surface 124 may have a resilient softer surface such as cork or a softer plastic material that may accept fasteners 128 such as thumbtacks or push pins. In one embodiment, the tackable display surface 124 may include a ferrous or magnetic backing to retain papers or photos with metallic or magnetic fasteners 128.

Figure 2:
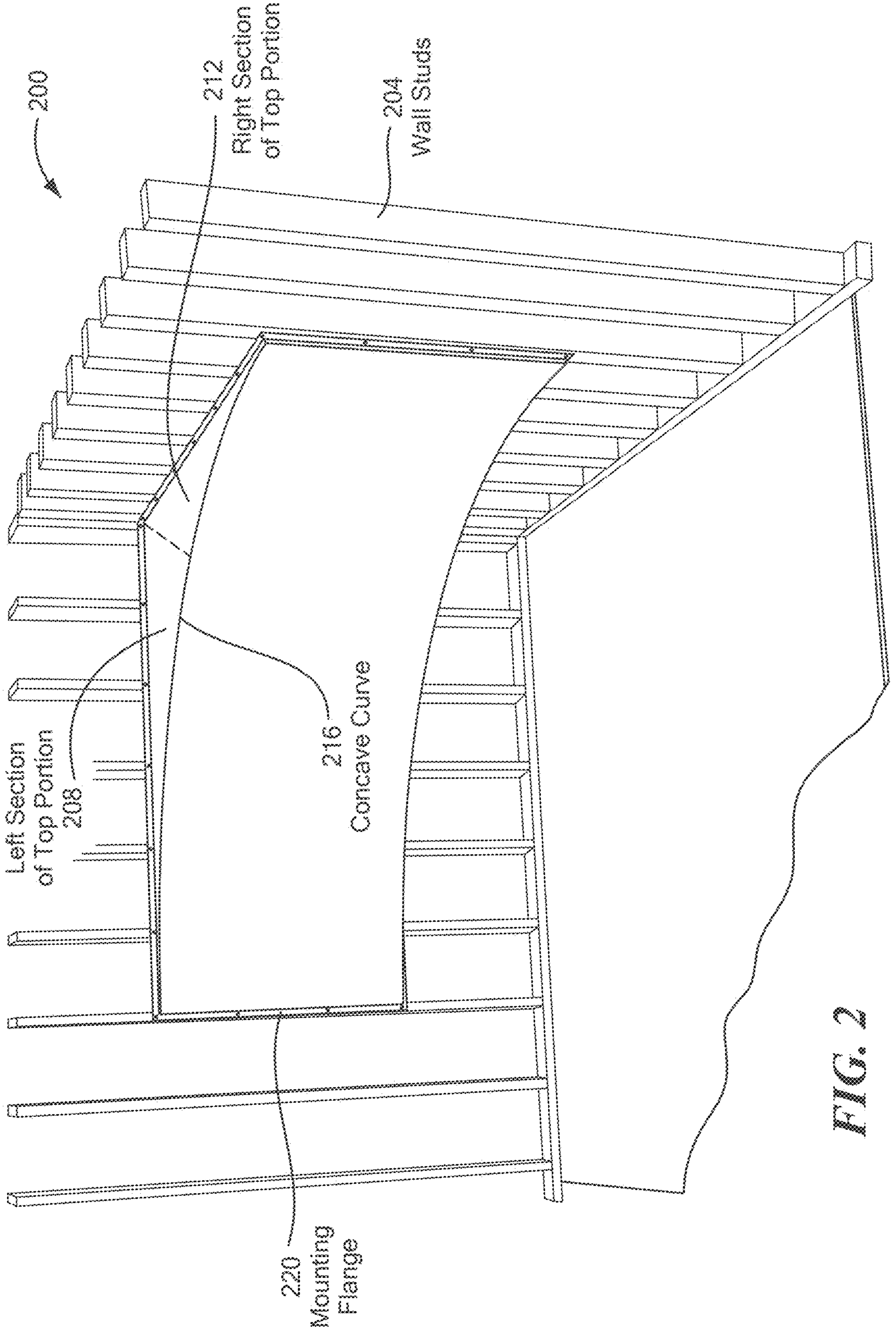
FIG. 2 schematically shows panoptic display surface installation prior to drywall installation in accordance with illustrative embodiments of the invention.

FIG. 2 schematically shows panoptic display surface installation prior to drywall installation 200 in accordance with illustrative embodiments of the invention. Preferably, the panoptic teaching surface 200 may be installed at a same time as wall construction.

The panoptic display surface 200 includes one or more mounting flanges 220. In one embodiment, mounting flanges 220 are provided for at least the top horizontal left and right edges. In other embodiments, mounting flanges 220 may also be provided for the lower horizontal left and right edges, the left vertical edge, and/or the right vertical edge. In one embodiment, the mounting flanges 220 may be predrilled with holes at expected stud locations, such as 16" on center. In other embodiment, the mounting flanges 220 may not be pre-drilled. In one embodiment, holes in the mounting flange 220 may be preferably countersunk to allow flat head screws to be used for a more flush appearance.

FIG. 2 illustrates a panoptic teaching surface 200 installed after wall stud framing 204 but before insulation or drywall. Installing the panoptic teaching surface 200 at this stage beneficially provides a cleaner installation by hiding the mounting flange 220 behind the drywall such that the drywall abuts edges of the panoptic display surface 200. In another embodiment, the panoptic display system 200 may be installed following insulation and drywall. However, this may be undesirable as it exposes the mounting flanges 220 and mounting fasteners but with a benefit of allowing easier removability of the panoptic display system 200.

The panoptic display system 100, 150, 200 may include a top portion 104 that includes a left section 208, a right section 212, and a concave curve 216 between the left 208 and right 212 sections. The bottom portion 108 may also include a left section, a right section, and a concave curve between the left and right sections.

In one embodiment, the top 104 and bottom 108 portions may be formed a single monolithic surface. In another embodiment, the top 104 and bottom 108 portions may each be formed from separate left and right sections that are joined before mounting to the vertical concave surface 116. The top portion 104 may be separated from the bottom portion 108 by a vertical distance, for example, from about 2-4 feet. This allows a vertical concave surface 116 to be fixed to front edges of the top 104 and bottom 108 portions to form the display system 100, 150, 200.

In a preferred embodiment, the panoptic display system 100, 150, 200 may be manufactured, transported, and installed as a single unit. This beneficially allows for immediate installation following framing inspection and an efficient installation workflow.

Figure 3:
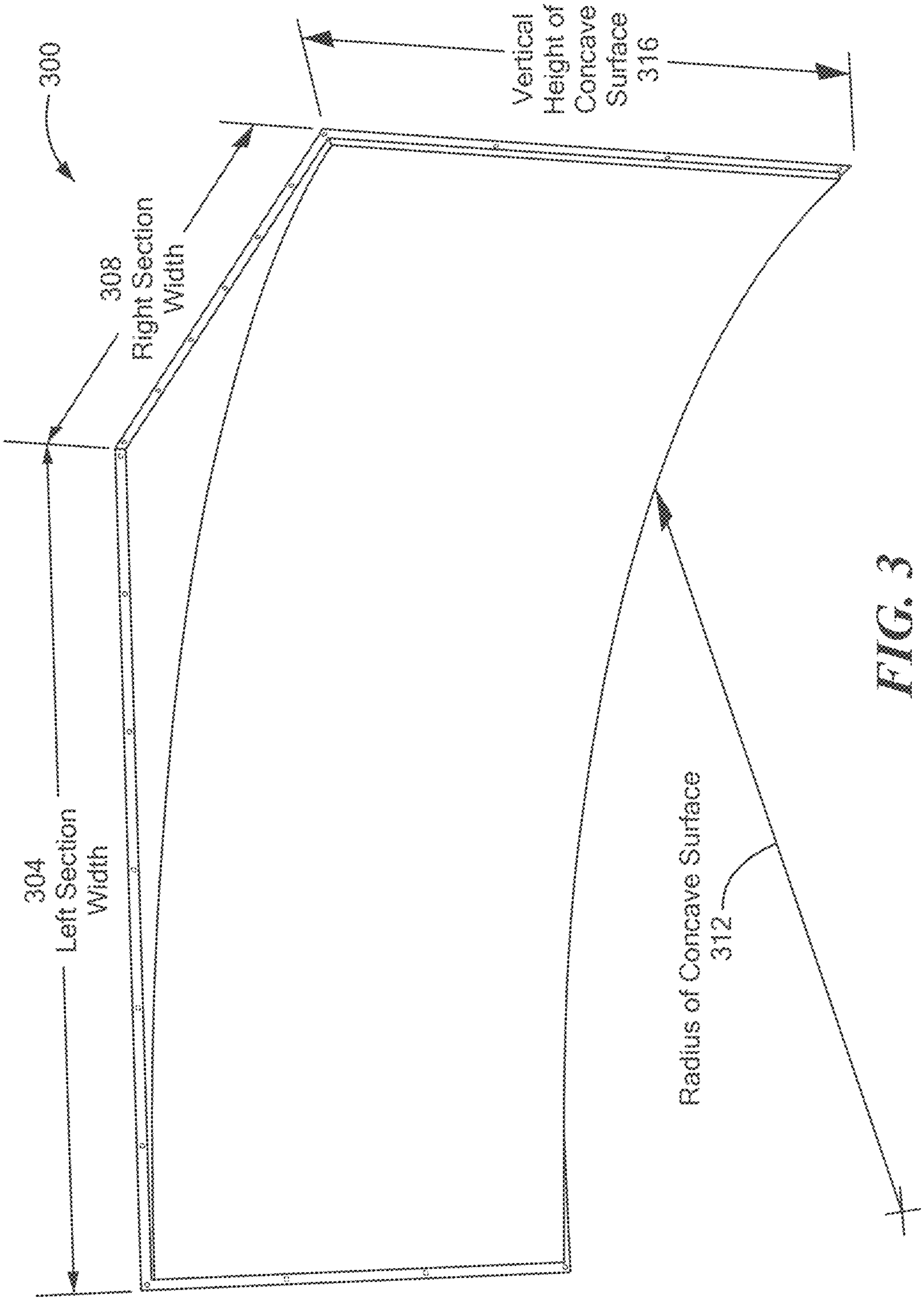
FIG. 3 schematically shows a front view of a panoptic display surface in accordance with illustrative embodiments of the invention.

FIG. 3 schematically shows a front view of a panoptic display surface 300 in accordance with illustrative embodiments of the invention. A panoptic display system 100, 150 includes a left section width 304, a right section width 308, and a vertical height of concave surface 316. In one embodiment, the concave surface 312 may have a radius 312. In a preferred embodiment, the radius 312 may be the same as the left section width 304 and the right section width 308.

In one embodiment, the left 304 and right 308 sections may each be about feet wide. This may provide a useful amount of display space without using a significant amount of valuable wall surface. However, other dimensions for the left 304 and right sections 308 may be used to accommodate available wall space. The vertical height of the concave surface 316 may be any dimension, although from 2-4 feet seems ideal for most presenters 132.

Figure 4:
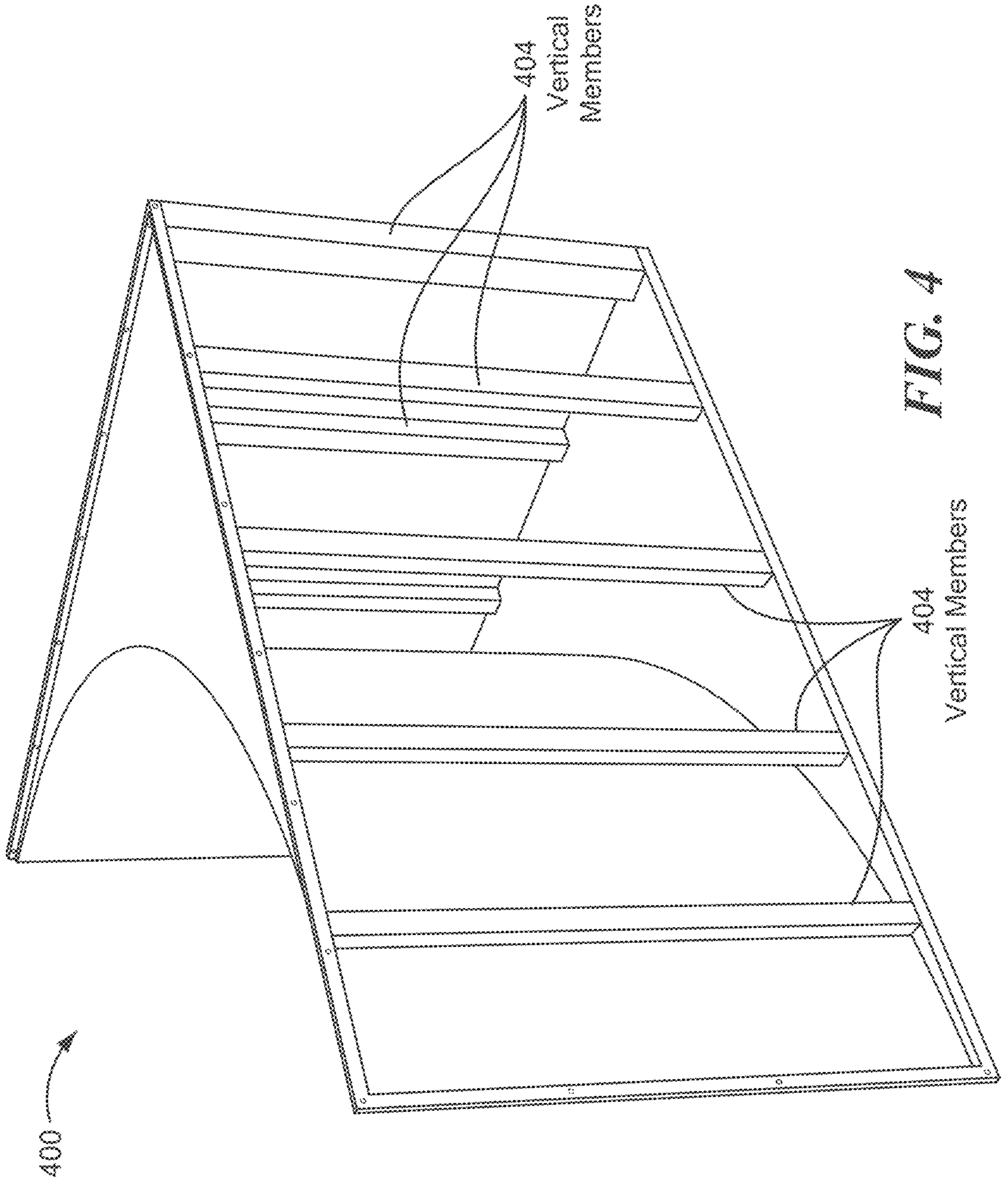
FIG. 4 schematically shows a rear view of a panoptic display surface in accordance with illustrative embodiments of the invention.

FIG. 4 schematically shows a rear view of a panoptic display surface 400 in accordance with illustrative embodiments of the invention. FIG. 4 illustrates an embodiment showing internal bracing with vertical members 404. In one embodiment, the vertical members 404 add stiffness to the complete structure for improved durability and ease of relocating the panoptic display surface 100, 150, if needed. The internal bracing may include a number of vertical members 404 between the top 104 and bottom 108 portions. In one embodiment, the vertical members 404 may face the left and right walls, as shown. This may beneficially provide other wall attachment points for more solid mounting to the left and right walls. In another embodiment (not shown), one or more vertical members 404 may be directly behind the vertical concave surface 116. This may provide support surfaces to facilitate vertical concave portion reconfiguration, as discussed herein. Vertical members 404 directly behind the vertical concave surface 116 may be combined with vertical members 404 facing the left and right walls.

In one embodiment, the panoptic display system may include a single light source (not shown) to provide backlight to one or more translucent sections of the vertical concave surface 116. This may facilitate readability of text drawn on the front of the vertical concave surface 116 or of display of images such as X-rays or mylar schematics or architectural plans, especially in darkened rooms or rooms with limited internal lighting. In one embodiment, the system may include a control to dim the light source to achieve a preferred contrast to lighting conditions within the room.

In lieu of a single light source to backlight the entire vertical concave surface 116, the panoptic display system may include a series of internal baffles to subdivide the interior (not shown). Individual light sources may be located within each chamber bordered by the internal baffles, and each light source may be configured to illuminate a unique section of the vertical concave surface 116. The internal baffles may prevent light source leakage between sections such that a first light source will only illuminate a corresponding section and not adjacent sections. This may be beneficial for systems where the vertical concave surface 116 includes a mixture of translucent sections (which may be dry erase surfaces) and tackable surfaces, or dry erase surfaces and translucent surfaces (if not also dry erase surfaces). In such cases, it may be desirable to only backlight some or all of the translucent surfaces and no tackable or dry erase surfaces that are not translucent.

In one embodiment, a panoptic display system may include a single light source (not shown). In another embodiment, panoptic display system may include a number of individual light sources to provide individually lit zones (not shown). For example, three zones may be on the left side of the vertical concave surface 116 and used as translucent dry erase surfaces by a presenter 132. The system may include a control panel to control lighting for the display surfaces. For example, each zone may include separate lighting controls for on/off, brightness, color temperature, and/or color. This allows the presenter 132 to control each zone individually to suit the nature of the display. For example, two zones may be tackable surfaces, three zones may be translucent dry erase surfaces, and one zone may be a non-dry erase but translucent surface.

In one embodiment (not shown), a movable system may include any other features of the panoptic display surfaces discussed herein. For example, a movable panoptic display system may include features that facilitate vertical upward and downward movement at the corner of a room. Upward and downward movement may be desirable to accommodate short or tall presenters 132 and presenters 132 having limited mobility, such as in a wheelchair. In most cases, it may be desirable for the presenter 132 to have head and shoulders approximately vertically centered on the vertical concave surface 116 such that all points on the vertical concave surface 116 may be reached without requiring a step stool or bending over/kneeling.

A movable panoptic display system may include a number of vertical tracks or guides fixed to the walls. The tracks or guides may engage one or more wheels or rollers that roll vertically within the tracks or guides. The system may include any number of tracks or guides, and the number may depend on a weight of the system. In one embodiment, the system may include one or more vertical locking devices to maintain a selected height of the system. When engaged, the vertical locking devices may prevent vertical travel of the system. When disengaged, the system may be freely raised or lowered along the tracks or guides.

In one embodiment, the system may be lightweight and include no movement assistance devices. In another embodiment, the system may be somewhat heavier and incorporate a weight counterbalance system that allows a user or presenter 132 to move the system upward or downward with only a few pounds of force. In another embodiment, the system may include one or more actuators and controls to move the system upward or downward with pushbuttons or other controls and no manual effort. For example, the system may include electric motors at each of the outside vertical tracks. A presenter 132 may access a control panel or other control means (e.g., application on a smartphone, etc.) to cause the motors to raise or lower the systema selected distance.

In one embodiment, the system may be automated to raise and lower the display surface without manual presenter 132 intervention. For example, a proximity detector (e.g., ultrasonic sonar or other device) may detect a presenter 132 proximate the display surface. A processor coupled to the proximity sensor may receive the proximity indication from the proximity detector and determine if the presenter 132 is likely to use the display surface. For example, once proximity is detected, the processor may wait a period of time to determine if the presenter proximity detector still detects the presenter 132. For example, if the presenter 132 is still present after 10 seconds, the processor may determine the presenter 132 is not simply passing by and should be accommodated. The processor may obtain data from a presenter height sensor that indicates the presenter's height. For example, analysis of a camera image, a light beam/photocell combination, or a Sonar/Lidar device may provide the required data. The processor may access a data structure in a memory device that cross references a current height of the display surface with a height of the presenter 132 to determine how far upward or downward the system should be moved. The desire is to result in the head and shoulders of the presenter 132 being approximately vertically centered with respect to the vertical concave surface 116. In this way, the system may automatically adjust for different height presenters 132 while filtering out (not responding to) others passing by the display surface not being presenters 132.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A display surface, comprising:

a top portion comprising a left section, a right section, and a concave curve between the left and right sections;

a bottom portion, comprising a left section, a right section, and a concave curve between the left and right sections, a vertical distance below the top portion, a radius of the concave curves of the top and bottom portions equal to a width of the left and right sections of the top and bottom portions;

a vertical concave surface, between and directly coupled to the concave curve of the top and bottom portions, comprising one or more of a dry-erase surface, a tackable surface, a magnetic surface, and a writeable magnetic surface; and a pair of mounting flanges affixed to edges of the left and right sections of the top portion, configured to be directly affixed to wall studs and covered by drywall material to hide the mounting flanges under the drywall.

2. The display surface of claim 1, wherein the vertical concave surface is a dry-erase surface, wherein the dry erase surface faces outwardly from the display surface and allows writing or illustration to be applied to the dry erase surface.

3. The display surface of claim 1, wherein the vertical concave surface is a tackable surface, wherein the tackable surface faces outwardly from the display surface and is configured to retain lightweight objects to the concave surface with fasteners or magnets.

4. The display surface of claim 1, wherein the vertical concave surface is a magnetic surface, wherein the magnetic surface is configured to retain lightweight objects to the concave surface with one of magnets or ferromagnetic objects.

5. The display surface of claim 1, wherein the display surface is configured to be mounted to an inside corner of a room such that intersections of the left and right sections of the top and bottom portions contact the inside corner.

6. The display surface of claim 1, further comprising:

one or more vertical members between the top and bottom portions, configured to add stiffness to the display surface.

7. The display surface of claim 1, wherein the concave surface has a height of 2-4 feet.

8. The display surface of claim 1, further comprising:

one or more mounting flanges affixed to one or more external edges, configured to affix the display surface to wall studs.

9. A radiused wedge, comprising:

top and bottom surfaces, each comprising:

straight left rear and right rear edges meeting at a common point and angled with respect to each other; and an inwardly curved front edge that extends between a leftmost point of the left rear edge and a rightmost point of the right rear edge;

a concave vertical surface, between the front edges of the top and bottom surfaces, comprising one or more of a dry-erase surface, a tackable surface, a magnetic surface, and a writeable magnetic surface, the inwardly curved front edges and the vertical surface having a common horizontal plane radius that is the same as a width of the left rear edges and the right rear edges of the top and bottom surfaces; and a pair of mounting flanges affixed to the left and right rear edges of the top surface, configured to be directly affixed to wall studs and covered by drywall material to hide the mounting flanges under the drywall.

10. The radiused wedge of claim 9, wherein the concave vertical surface is a dry-erase surface, wherein the dry erase surface faces outwardly from the concave surface and allows writing or illustration to be applied to the dry erase surface.

11. The radiused wedge of claim 9, wherein the concave vertical surface is a tackable surface, wherein the tackable surface is configured to retain lightweight objects to the concave surface with fasteners or magnets.

12. The radiused wedge of claim 9, wherein the concave vertical surface is a magnetic surface, wherein the magnetic surface is configured to retain lightweight objects to the concave surface with one of magnets or ferromagnetic objects.

13. The radiused wedge of claim 9, wherein the concave vertical surface is configured to be mounted to an inside corner of a room such common points of the top and bottom surfaces contact the inside corner.

14. The radiused wedge of claim 9, further comprising:
one or more vertical members between the top and bottom surfaces, configured to add stiffness to the radiused wedge.

15. The radiused wedge of claim 9, further comprising:
one or more mounting flanges affixed to one or more external edges, configured to affix the radiused wedge to wall studs.

16. A method, comprising:
forming identical horizontal top and bottom isosceles triangular surfaces, the top and bottom surfaces each having a concave hypotenuse and identical left and right isosceles triangle widths;
forming a concave vertical surface comprising one or more of a dry-erase surface, a tackable surface, a magnetic surface, and a writeable magnetic surface;
affixing the vertical surface to the concave hypotenuse of the top and bottom surfaces to create a display surface, the concave hypotenuse of the top and bottom surfaces and the vertical surface having a common horizontal radius, the common horizontal radius equal to the left and right isosceles triangle widths; and
affixing a pair of mounting flanges to edges of the left and right isosceles triangle widths of the top surface, configured to be directly affixed to wall studs and covered by drywall material to hide the mounting flanges under the drywall.

17. The method of claim 16, wherein external edges of the top and bottom surfaces are affixed to one or more mounting flanges configured to affix the display surface to wall studs of a room interior.

18. The method of claim 16, further comprising:
affixing one or more vertical members between the top and bottom surfaces, configured to add stiffness to the display surface.

* * * * *